(12) United States Patent
Albero et al.

(10) Patent No.: US 11,956,633 B2
(45) Date of Patent: Apr. 9, 2024

(54) APPLICATION PROGRAMMING INTERFACE (API) FOR UNIFORM SECURITY ACCESS ON A 5G NETWORK

(71) Applicant: Bank of America Corporation, Charlotte, NC (US)

(72) Inventors: George Albero, Charlotte, NC (US); Maharaj Mukherjee, Poughkeepsie, NY (US); Deborah Mayers, Charlotte, NC (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 333 days.

(21) Appl. No.: 17/536,256

(22) Filed: Nov. 29, 2021

(65) Prior Publication Data
US 2023/0171599 A1    Jun. 1, 2023

(51) Int. Cl.
*H04W 12/082* (2021.01)
*H04W 12/06* (2021.01)
*H04W 12/30* (2021.01)

(52) U.S. Cl.
CPC ......... *H04W 12/082* (2021.01); *H04W 12/06* (2013.01); *H04W 12/35* (2021.01)

(58) Field of Classification Search
CPC .... H04W 12/082; H04W 12/06; H04W 12/35
See application file for complete search history.

(56) References Cited

U.S. PATENT DOCUMENTS

| | | | |
|---|---|---|---|
| 9,667,915 B2 | 5/2017 | Baldelli et al. | |
| 9,681,154 B2 | 6/2017 | Tian | |
| 9,729,827 B2 | 8/2017 | Vendrow | |
| 9,860,487 B2 | 1/2018 | Kim et al. | |
| 9,912,907 B2 | 3/2018 | De Magalhaes | |
| 9,942,519 B1 | 4/2018 | Pan et al. | |
| 9,967,519 B1 | 5/2018 | Lin | |

(Continued)

OTHER PUBLICATIONS

Datta et al., "Virtual Reality Mobile Application Testing in a 5G Testbed", Jul. 2019, Eleventh International Conference on Ubiquitous and Future Networks, pp. 455-459 (Year: 2019).*

(Continued)

*Primary Examiner* — Kenneth W Chang
(74) *Attorney, Agent, or Firm* — Banner & Witcoff, Ltd.

(57) ABSTRACT

Aspects of the disclosure relate to computing hardware and software for uniform security access. A computing platform may receive, from a 5G device, a request to access a collaborative experience service. The computing platform may identify whether the 5G device is authenticated. Based on identifying that the 5G device is authenticated, the computing platform may grant the 5G device access to an API that may be used to access the collaborative experience service. The computing platform may identify that attributes of the 5G device comply with a stored security policy, and grant access to the collaborative experience service in response. The computing platform may receive user interaction information from the 5G device, and may input the user interaction information into an anomaly detection model. Based on identifying that the interactions do not comprise an anomaly for the user, the computing platform may maintain the access to the collaborative experience service.

20 Claims, 9 Drawing Sheets

(56) References Cited

U.S. PATENT DOCUMENTS

| | | |
|---|---|---|
| 9,992,243 B2 | 6/2018 | DeLuca et al. |
| 10,334,208 B2 | 6/2019 | Pan et al. |
| 10,404,943 B1 | 9/2019 | Fieldman |
| 10,447,745 B2 | 10/2019 | Vuong |
| 10,609,438 B2 | 3/2020 | Branch et al. |
| 10,715,765 B2 | 7/2020 | Vendrow |
| 10,768,885 B1 | 9/2020 | Fieldman |
| 10,771,740 B1 | 9/2020 | Reynolds et al. |
| 10,771,741 B1 | 9/2020 | Reynolds et al. |
| 10,931,676 B2 | 2/2021 | Pantazelos |
| 10,999,227 B1 | 5/2021 | Yan |
| 11,010,810 B1 | 5/2021 | Pylant |
| 11,032,516 B1 | 6/2021 | Walters et al. |
| 11,055,055 B1 | 7/2021 | Fieldman |
| 11,477,509 B2 | 10/2022 | Branch et al. |
| 2008/0317292 A1 | 12/2008 | Baker et al. |
| 2014/0333414 A1 | 11/2014 | Kursun |
| 2015/0052587 A1* | 2/2015 | O'Neill .................. G06F 21/33 726/4 |
| 2020/0382531 A1* | 12/2020 | Albero ................ H04L 63/1425 |
| 2021/0074068 A1* | 3/2021 | Spivack ................. G06N 20/00 |
| 2021/0314408 A1* | 10/2021 | Hodge .................... G06F 21/32 |

OTHER PUBLICATIONS

Batuwanthudawa et al., "Real-Time Location based Augmented Reality Advertising Platforms", Dec. 2020, 2nd International Conference on Advancements in Computing, pp. 174-179 (Year: 2020).*
Dec. 7, 2023—U.S. Office Action—U.S. Appl. No. 17/526,177.

* cited by examiner

Non-Compliant Parameter Notification

Please note that your operating system is non-compliant with the required event parameters. Please update your system, and submit a subsequent request to join.

Anomaly Detection Notification

Anomalous behavior has been identified for participant #1. Would you like to temporarily remove them from the event?

| Yes | No |

FIG. 5

APPLICATION PROGRAMMING INTERFACE (API) FOR UNIFORM SECURITY ACCESS ON A 5G NETWORK

BACKGROUND

Aspects of the disclosure relate to computing hardware and software, particularly distributed computing hardware and software for collaborative virtual experiences. When individuals/devices participate in collaborative virtual experiences (e.g., virtual meetings, and/or other experiences), they may, in some instances, interact with different models or types of devices. Accordingly, such devices may be configured with different device/security parameters, some of which may be more effective than others. As such virtual collaborative experiences become more prevalent, it is increasingly important to improve methods for providing uniform device security in such experiences.

SUMMARY

Aspects of the disclosure provide effective, efficient, scalable, and convenient technical solutions that address and overcome the technical problems associated with developing and implementing computer hardware and software that provides uniform security for application programming interfaces (APIs) on a 5G network. In accordance with one or more embodiments of the disclosure, a computing platform comprising at least one processor, a communication interface, and memory storing computer-readable instructions may receive, from a 5G compatible user device, a request to access a collaborative experience service, where the collaborative experience service provides one or more of: augmented reality features or virtual reality features. The computing platform may attempt to authenticate the 5G compatible user device. After attempting to authenticate the 5G compatible user device, the computing platform may identify whether the 5G compatible user device is authenticated. Based on identifying that the 5G compatible user device is not authenticated, the computing platform may deny access to the collaborative experience service. Based on identifying that the 5G compatible user device is authenticated, the computing platform may grant the 5G compatible user device access to an application programming interface (API) that may be used to access the collaborative experience service. The computing platform may compare attributes of the 5G compatible user device to a stored security policy for the API. Based on comparing the attributes of the 5G compatible user device to the stored security policy for the API, the computing platform may identify whether the attributes of the 5G compatible user device comply with the stored security policy. Based on identifying that the attributes of the 5G compatible user device do not comply with the stored security policy, the computing platform may deny access to the collaborative experience service. Based on identifying that the attributes of the 5G compatible user device comply with the stored security policy, the computing platform may grant access to the collaborative experience service. The computing platform may receive user interaction information indicating interactions of a user of the 5G compatible user device with the collaborative experience service, which may indicate one or more of: augmented reality interactions or virtual reality interactions. The computing platform may input the user interaction information into an anomaly detection model, which may cause the anomaly detection model to analyze the user interaction information to identify if the interactions comprise an anomaly for the user. Based on identifying that the interactions comprise an anomaly for the user, the computing platform may terminate the access to the collaborative experience service. Based on identifying that the interactions do not comprise an anomaly for the user, the computing platform may maintain the access to the collaborative experience service.

In one or more instances, receiving the user interaction information may include receiving, from one or more biometric data collection devices, the user interaction information. In one or more instances, terminating the access to the collaborative experience service may include one or more of: removing the user from the collaborative experience service, moving the user to a waiting room of the collaborative experience service, or prompting the user to re-authenticate to the collaborative experience service. In one or more instances, based on identifying that the interactions comprise an anomaly for the user, the computing platform may send a notification to system administer for the collaborative experience service indicating the detected one or more anomalies.

In one or more instances, the attributes of the 5G compatible user device may include one or more of: an operating system, a type of encryption, a type of connection, or a requested type of information. In one or more instances, granting the access to the collaborative experience service may include granting access to a subset of features offered by the collaborative experience service.

In one or more instances, granting the access to the collaborative experience service may include granting 5G compatible user device read-only permissions. In one or more instances, based on identifying that the attributes of the 5G compatible user device do not comply with the stored security policy, the computing platform may send a notification to the 5G compatible user device indicating one or more non-compliant attributes of the 5G compatible user device.

In one or more instances, based on identifying that the attributes of the 5G compatible user device do not comply with the stored security policy, the computing platform may send a software update to the 5G compatible user device to bring the 5G compatible user device in compliance with the stored security policy. In one or more instances, the anomaly detection model may be configured to continually analyze additional received user interaction information throughout a duration of the collaborative experience service.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an API for uniform security access on a 5G network. For example, not all devices may have the same security parameters or protocols. Accordingly, described herein is a method for creating a single uniform security API for all devices irrespective of their technology. Accordingly, any device that is going to connect to an AR/VR service may connect through the API, which would ensure that the same security protocol applies to all the devices.

These and other features are described in further detail below.

Figure 1A:
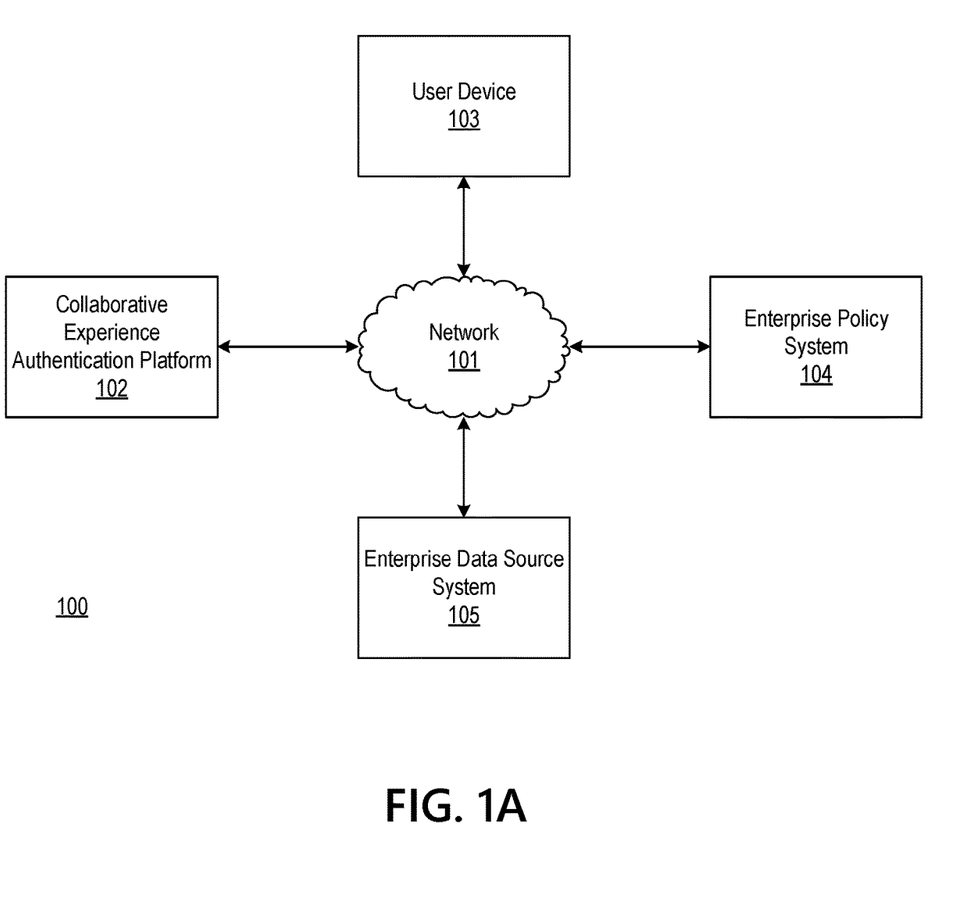
FIGS. 1A-1B depict an illustrative computing environment configured to provide an API for uniform security access on a 5G network in accordance with one or more example embodiments.
Figure 1B:
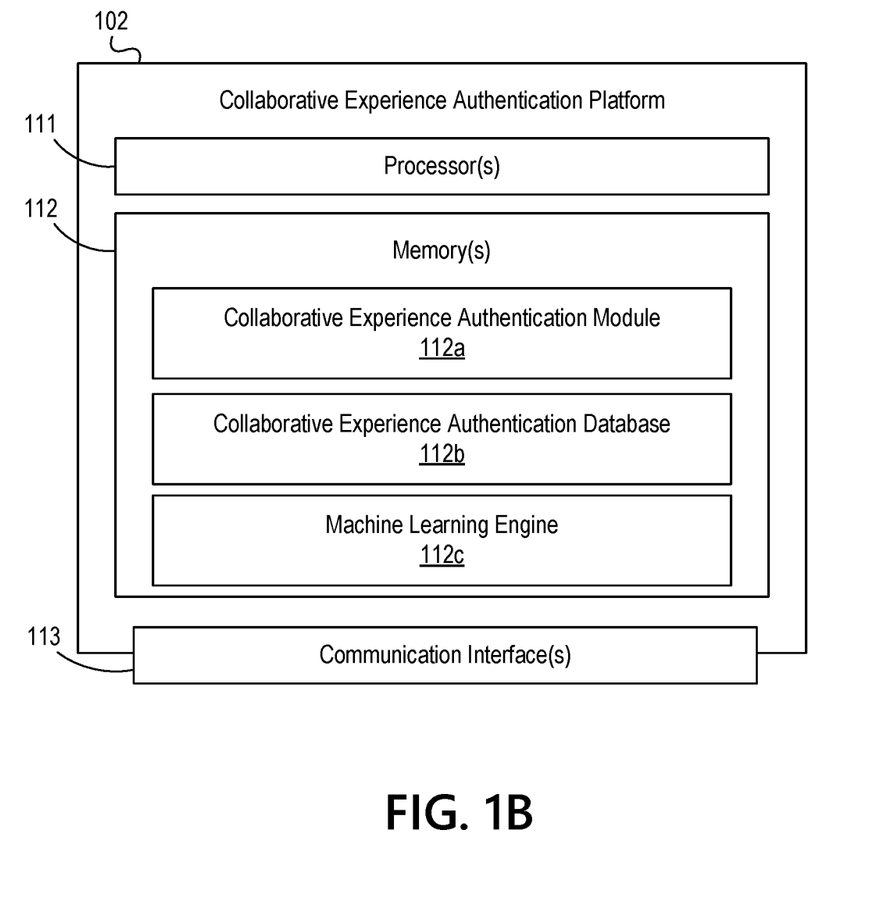

FIGS. 1A-1B depict an illustrative computing environment that provides an API for uniform security access on a 5G network in accordance with one or more example embodiments. Referring to FIG. 1A, computing environment 100 may include one or more computer systems. For example, computing environment 100 may include collaborative experience authentication platform 102, user device 103, enterprise policy system 104, and enterprise data source system 105.

As described further below, collaborative experience authentication platform 102 may be a computer system that includes one or more computing devices (e.g., servers, server blades, or the like) and/or other computer components (e.g., processors, memories, communication interfaces) that may be used to provide an API for uniform security access as described further below. In these instances, the collaborative experience authentication platform 102 may provide the API to support access to a collaborative experience service, which may, e.g., include one or more enhanced reality features (e.g., virtual reality, augmented reality, and/or other enhanced reality). In some instances, the collaborative experience authentication platform 102 may be configured for operation on a 5G network.

User device 103 may be and/or otherwise include a laptop computer, desktop computer, mobile device, tablet, smartphone, wearable device, virtual reality device (e.g., a headset or other device), an augmented reality device (e.g., glasses or other device), biometric data collection device, video camera, microphone, and/or other device that may be used by an individual to access one or more collaborative enhanced reality services (e.g., virtual reality (VR), augmented reality (AR), and/or other enhanced reality services). In some instances, the user device 103 may be configured for operation on a 5G network, and/or may be configured based on other parameters that may or might not conform with a security policy for the API. In some instances, user device 103 may be configured to display one or more user interfaces (e.g., enhanced reality interfaces, or the like). Although a single user device 103 is shown, any number of user devices may be deployed in the systems/methods described below without departing from the scope of the disclosure.

Enterprise policy system 104 may be one or more computing devices (e.g., servers, server blades, laptop computers, desktop computers, mobile devices, tablets, smartphones, servers, and/or other devices). In some instances, the enterprise policy system 104 may be configured to store a security policy to be enforced by the collaborative experience authentication platform 102.

Enterprise data source system 105 may be one or more computing devices (e.g., servers, server blades, and/or other devices). In some instances, the enterprise data source system 105 may be configured to store interaction information, device information, and/or other user information that may be used to train an anomaly detection model to detect anomalies in user and/or device interaction with the collaborative experience service.

Computing environment 100 also may include one or more networks, which may interconnect collaborative experience authentication platform 102, user device 103, enterprise policy system 104, and/or enterprise data source system 105. For example, computing environment 100 may include a network 101 (which may interconnect, e.g., collaborative experience authentication platform 102, user device 103, enterprise policy system 104, and/or enterprise data source system 105). In some instances, the network 101 may be a 5G network.

In one or more arrangements, collaborative experience authentication platform 102, user device 103, enterprise policy system 104, and/or enterprise data source system 105 may be any type of computing device capable of sending and/or receiving requests and processing the requests accordingly. For example, collaborative experience authentication platform 102, user device 103, enterprise policy system 104, enterprise data source system 105, and/or the other systems included in computing environment 100 may, in some instances, be and/or include server computers, desktop computers, laptop computers, enhanced reality devices, tablet computers, smart phones, cameras, microphones, biometric devices, or the like that may include one or more processors, memories, communication interfaces, storage devices, and/or other components. As noted above, and as illustrated in greater detail below, any and/or all of collaborative experience authentication platform 102, user device 103, enterprise policy system 104, and/or enterprise data source system 105 may, in some instances, be special-purpose computing devices configured to perform specific functions.

Referring to FIG. 1B, collaborative experience authentication platform 102 may include one or more processors 111, memory 112, and communication interface 113. A data bus may interconnect processor 111, memory 112, and communication interface 113. Communication interface 113 may be a network interface configured to support communication between collaborative experience authentication platform 102 and one or more networks (e.g., network 101, or the like). Memory 112 may include one or more program modules having instructions that when executed by processor 111 cause collaborative experience authentication platform 102 to perform one or more functions described herein and/or one or more databases that may store and/or otherwise maintain information which may be used by such program modules and/or processor 111. In some instances, the one or more program modules and/or databases may be stored by and/or maintained in different memory units of collaborative experience authentication platform 102 and/or by different computing devices that may form and/or otherwise make up collaborative experience authentication platform 102. For example, memory 112 may have, host, store, and/or include collaborative experience authentication module 112a, collaborative experience authentication database 112b, and/or machine learning engine 112c.

Collaborative experience authentication module 112a may have instructions that direct and/or cause collaborative experience authentication platform 102 to provide improved collaborative experience security, as discussed in greater detail below. Collaborative experience authentication database 112b may store information used by collaborative experience authentication module 112a and/or collaborative experience authentication platform 102 in application of advanced techniques to provide improved collaborative experience security, and/or in performing other functions. Machine learning engine 112c may be used by the collaborative experience authentication module 112a and/or the collaborative experience authentication platform 102 to train, maintain, and/or otherwise refine an anomaly detection model that may be used to provide enhanced collaborative experience security.

Figure 2A:
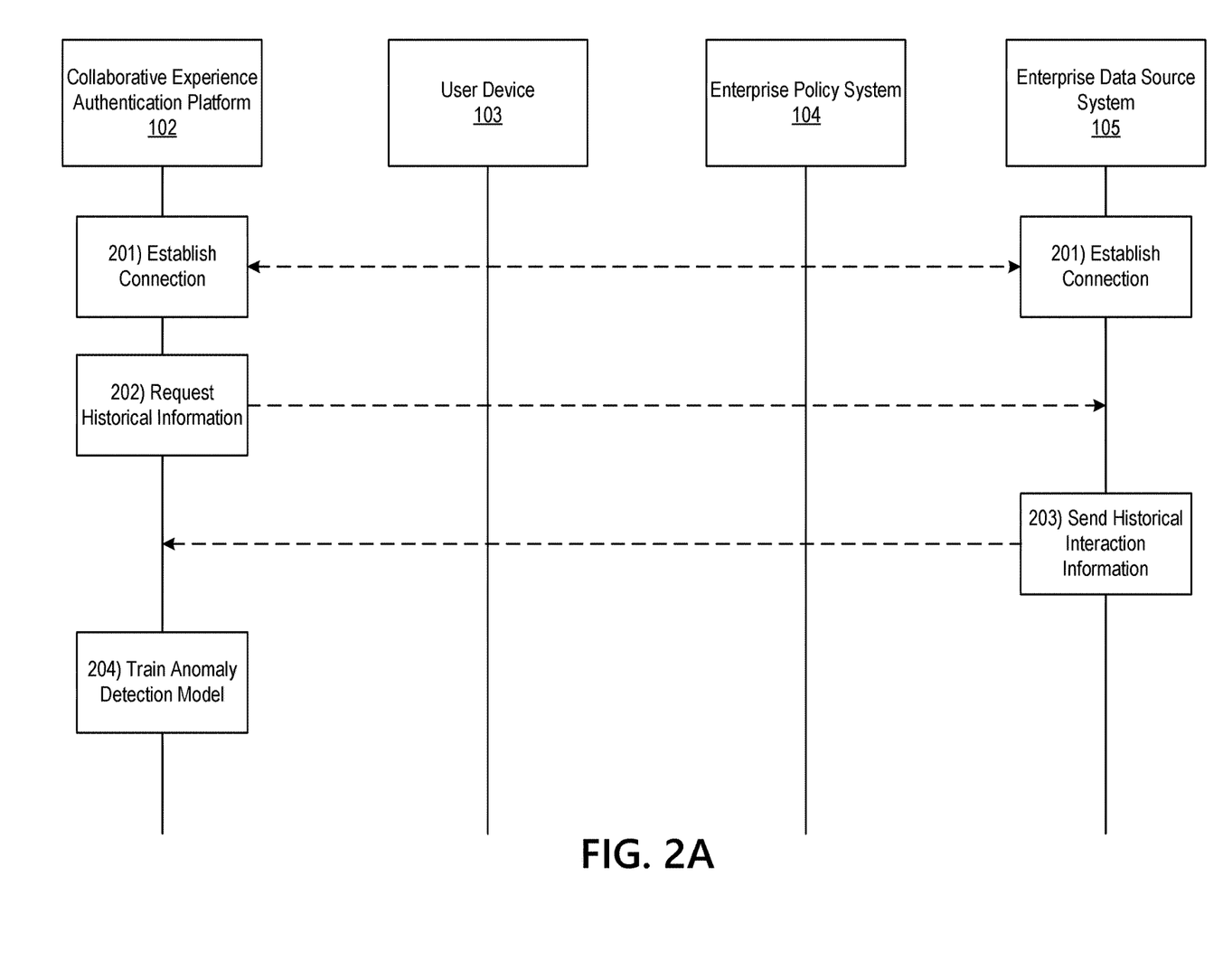
FIGS. 2A-2E depict an illustrative event sequence for providing an API for uniform security access on a 5G network in accordance with one or more example embodiments.

FIGS. 2A-2E depict an illustrative event sequence for providing an API for uniform security access on a 5G network in accordance with one or more example embodiments. Referring to FIG. 2A, at step 201, the collaborative experience authentication platform 102 may establish a connection with the enterprise data source system 105. For example, the collaborative experience authentication platform 102 may establish a first wired or wireless data connection with the enterprise data source system 105 to link the collaborative experience authentication platform 102 with the enterprise data source system 105 (e.g., in preparation for requesting historical interaction information). In some instances, the collaborative experience authentication platform 102 may identify whether or not a connection is already established with the enterprise data source system 105. If a connection is already established with the enterprise data source system 105, the collaborative experience authentication platform 102 might not re-establish the connection. If a connection is not yet established with the enterprise data source system 105, the collaborative experience authentication platform 102 may establish the first wired or wireless data connection as described herein.

At step 202, the collaborative experience authentication platform 102 may request historical interaction information from the enterprise data source system 105 (e.g., via the communication interface 113 and while the first wired or wireless data connection is established). In some instances, in requesting the historical interaction information, the collaborative experience authentication platform 102 may request historical movement information (e.g., avatar hand movements, avatar dominant hands, running gaits of the avatars, head turning motions of the avatars, eye movements), audio information (e.g., speech patterns), biometric information, device connectivity information, pattern information, and/or other information that may be used to establish baseline user and/or device interaction patterns and train a machine learning model to perform anomaly detection. In some instances, in requesting the historical interaction information, the collaborative experience authentication platform 102 may request historical interaction information for a plurality of users.

At step 203, the enterprise data source system 105 may send the historical interaction information requested at step 202. For example, the enterprise data source system 105 may send the historical interaction information while the first wired or wireless data connection is established.

At step 204, the collaborative experience authentication platform 102 may train an anomaly detection model using the historical interaction information received at step 204. In doing so, the collaborative experience authentication platform 102 may train the anomaly detection model to identify anomalous behavior for a plurality of individuals. In some instances, users may opt in to a collaborative experience authentication service, and may provide initial interaction and/or biometric information through the creation of a user profile. In some instances, the collaborative experience authentication platform 102 may prompt users for different amounts/types of information in the user profiles based on services requested by the corresponding users. Once this initial information is used to train the anomaly model, the collaborative experience authentication platform 102 may collect additional information throughout various user interactions going forward, and may use this information to further train and/or otherwise refine the anomaly detection model/baselines accordingly (as described further below). In training the anomaly detection model, the collaborative experience authentication platform 102 may identify baseline values/patterns of avatar hand movements, avatar dominant hands, running gaits of the avatars, head turning motions of the avatars, speech patterns, eye movements, and/or other information indicating interactions, movements, and/or other data corresponding to various individuals. Accordingly, the collaborative experience authentication platform 102 may configure the anomaly detection model to identify anomalies in behavior or biometrics for participants in various collaborative experiences and/or their corresponding devices.

For example, the collaborative experience authentication platform 102 may train the anomaly detection model to identify whether any of the above described metrics are outside of a predetermined tolerance window when compared to the particular individual's baseline. If any of the above described metrics are outside of the predetermined tolerance window, the collaborative experience authentication platform 102 may identify an anomaly for the corresponding user. If none of the above described metrics are outside of the predetermined tolerance window, the collaborative experience authentication platform 102 may identify that no anomalous behavior has been detected for the corresponding user.

Although the receipt of information and training of the anomaly detection model is described with regard to steps 204, these processes may be continuous and dynamic throughout a duration of the collaborative experience. For example, data/information corresponding to participants may be continuously received and used to train, refine, and/or otherwise update the anomaly detection model to improve its performance, accuracy, and capabilities over time.

Figure 2B:
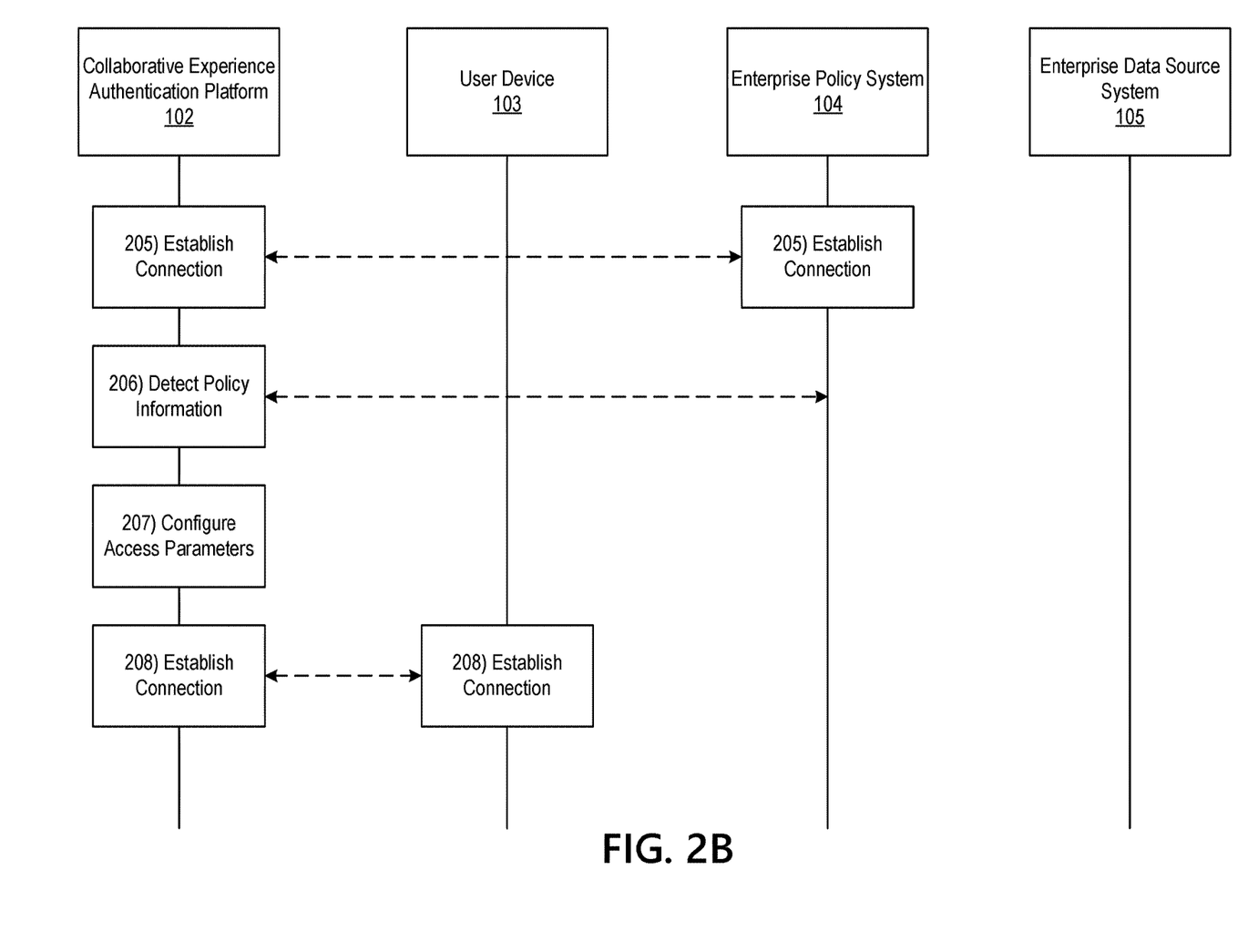

Referring to FIG. 2B, at step 205, the collaborative experience authentication platform 102 may establish a connection with the enterprise policy system 104. For example, the collaborative experience authentication platform 102 may establish a second wired or wireless data connection with the enterprise policy system 104 to link the collaborative experience authentication platform 102 with the enterprise policy system 104 (e.g., in preparation for detecting policy information). In some instances, the collaborative experience authentication platform 102 may identify whether or not a connection is already established with the enterprise policy system 104. If a connection is already established, the collaborative experience authentication platform 102 might not re-establish the connection. If a connection is not yet established, the collaborative experience authentication platform 102 may establish the second wired or wireless data connection as described herein.

At step 206, the collaborative experience authentication platform 102 may detect policy information from the enterprise policy system 104 (e.g., via the communication interface and while the second wired or wireless data connection is established). For example, the collaborative experience authentication platform 102 may detect a baseline parameter configuration (e.g., operating system, encryption types, connection types (e.g., physical, cloud based, or other connection types), types of requested information, a type of domain being accessed (e.g., public vs. private) and/or other parameters) with which user devices must comply to access the collaborative experience service.

At step 207, the collaborative experience authentication platform 102 may configure a set of stored access parameters to correspond to the policy information detected at step 206. At step 208, the user device 103 may establish a connection with the collaborative experience authentication platform 102. For example, the user device 103 may establish a third wired or wireless data connection with the collaborative experience authentication platform 102 to link the user device 103 to the collaborative experience authentication platform 102 (e.g., in preparation for requesting access to the collaborative experience service). In some instances, the user device 103 may identify whether a connection is already established with the collaborative experience authentication platform 102. If a connection is already established with the collaborative experience authentication platform 102, the user device 103 might not re-establish the connection. If a connection is not yet established with the collaborative experience authentication platform 102, the user device 103 may establish the third wired or wireless data connection as described herein.

Figure 2C:
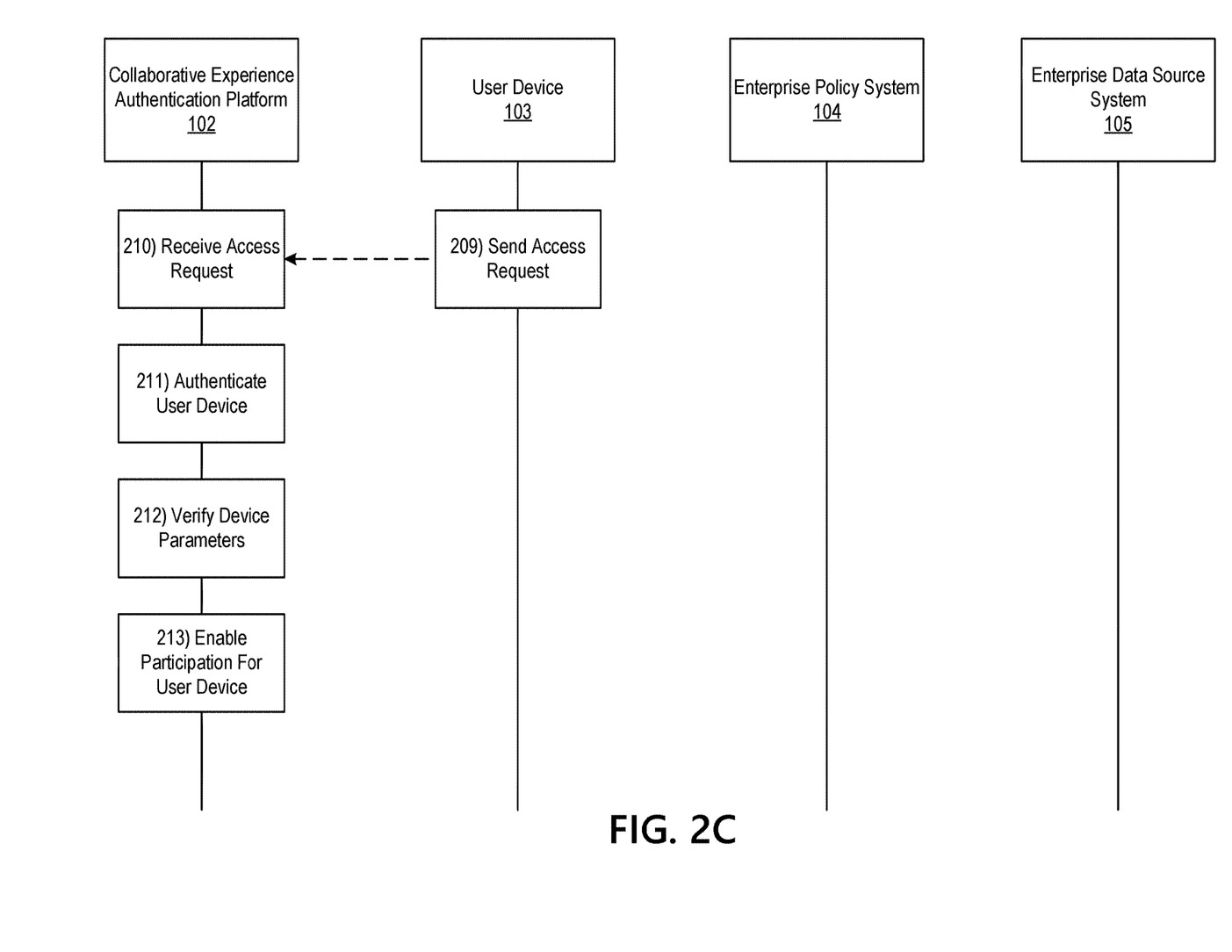

Referring to FIG. 2C, at step 209, the user device 103 may send a request to access the collaborative experience service to the collaborative experience authentication platform 102. For example, the user device 103 may send a request to access an enhanced reality experience (e.g., VR, AR, and/or other enhanced reality experience). For example, the user device 103 may send the request to access the collaborative experience service while the third wired or wireless data connection is established. In some instances, the user device 103 may send the request to access the collaborative experience service and/or otherwise interact with the collaborative experience authentication platform 102 over a 5G network. In some instances, in requesting access to the collaborative experience service, the user device 103 may request access to augmented reality services/features, virtual reality services/features, and/or other services/features.

At step 210, the collaborative experience authentication platform 102 may receive the request to access the collaborative experience service (e.g., sent at step 209). For example, the collaborative experience authentication platform 102 may receive the request to access the collaborative experience service via the communication interface 113 and while the third wired or wireless data connection is established.

At step 211, the collaborative experience authentication platform 102 may verify an authorization channel for the user device 103. For example, the collaborative experience authentication platform 102 may authorize the user device 103 based on a user identifier, device identifier, authentication token, and/or other authentication mechanism, which may have been received along with the request to access the collaborative experience service. In some instances, in verifying the authentication channel, the collaborative experience authentication platform 102 may verify an authentication channel that is specific to the user device 103 and that is independent of quality on a 5G network over which the request to access the collaborative experience was sent. If the collaborative experience authentication platform 102 verifies the authentication channel for the user device 103, the collaborative experience authentication platform 102 may proceed to step 212. Otherwise, if the collaborative experience authentication platform 102 does not verify the authentication channel for the user device 103, the collaborative experience authentication platform 102 might not proceed to step 212, and may instead await a subsequent request to access the collaborative experience service and/or otherwise monitor participants of the collaborative experience service as described further below.

In some instances, based on or in response to validating an authorization channel for the user device 103, the collaborative experience authentication platform 102 may grant the user device 103 access to a collaborative experience service (which may, e.g., be an API configured to grant further access to downstream services such as collaborative enhanced reality experiences), prior to performing the parameter verification described below at step 212.

Figure 4:
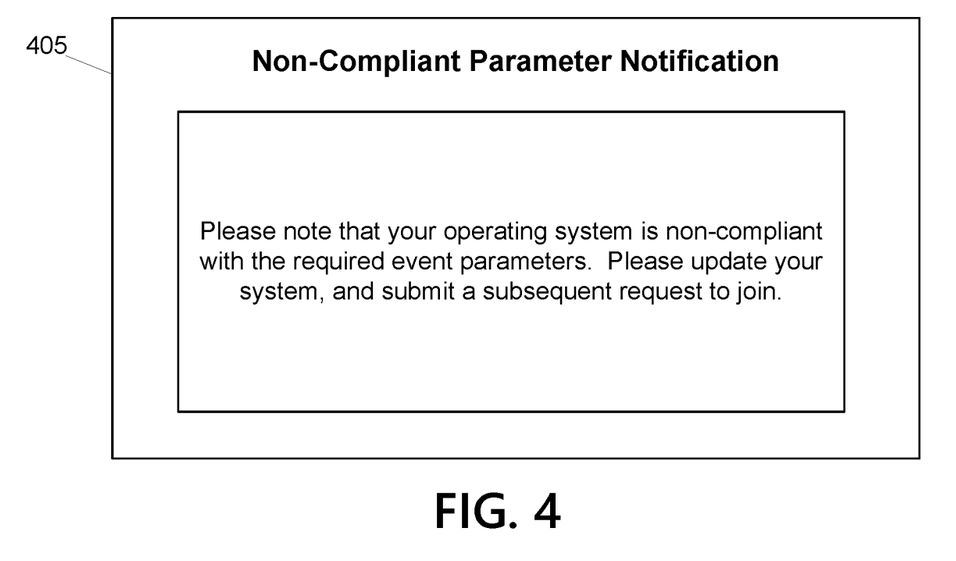
FIGS. 4 and 5 depict illustrative graphical user interfaces/notifications associated with an API for uniform security access on a 5G network in accordance with one or more example embodiments.

At step 212, the collaborative experience authentication platform 102 may verify that parameters of the user device comply with the access parameters configured at step 207. For example, the collaborative experience authentication platform 102 may compare, for the user device 103, one or more of an operating system, encryption types, connection types, types of requested information, security protocols, and/or other parameters to the access parameters. If the collaborative experience authentication platform 102 identifies that the parameters of the user device do comply with the access parameters, the collaborative experience authentication platform 102 may proceed to step 213. Otherwise, if the collaborative experience authentication platform 102 determines that the parameters of the user device 103 do not comply with the access parameters, collaborative experience authentication platform 102 might not proceed to step 213, and may instead await a subsequent request to access downstream services of the collaborative experience service and/or otherwise monitor participants of the collaborative experience service as described further below. In some instances, the collaborative experience authentication platform 102 may send a notification to the user device 103 indicating that the parameters for the user device 103 are non-compliant, and identifying any non-compliance parameters (which may, e.g., be similar to notification 405, which is shown in FIG. 4). In some instances, if the collaborative experience authentication platform 102 determines that the parameters of the user device 103 do not comply with the access parameters, the collaborative experience authentication platform 102 may nevertheless proceed to step 213, but may enable limited participation for the user device 103 as described further below. In some instances, if the collaborative experience authentication platform 102 determines that the parameters of the user device 103 do not comply with the access parameters, the collaborative experience authentication platform 102 may push a link to download updated security software or otherwise update the device parameters (or in some instances, the collaborative experience authentication platform 102 may automatically push such updates to the user device 103). In some instances, the collaborative experience authentication platform 102 may deploy an avatar to assist a user of the user device 103 with the device updates.

In some instances, in attempting to verify the parameters of the user device 103, the collaborative experience authentication platform 102 may also verify parameters of any add on devices connected to the user device 103 (e.g., a mouse, keyboard, camera, speakers, microphone, and/or other devices).

At step 213, based on or in response to successfully verifying the device parameters at step 212, the collaborative experience authentication platform 102 may enable participation in one or more downstream services of the API. In some instances, the collaborative experience authentication platform 102 may enable participation for the user device 103 even though the user device 103's parameters were not verified. For example, the collaborative experience authentication platform 102 may enable limited participation for the user device 103. In this example, the collaborative experience authentication platform 102 may limit the user device 103 to read only permission, muted access, limit downloads to the user device 103, and/or otherwise limit participation of the user device 103.

Figure 2D:
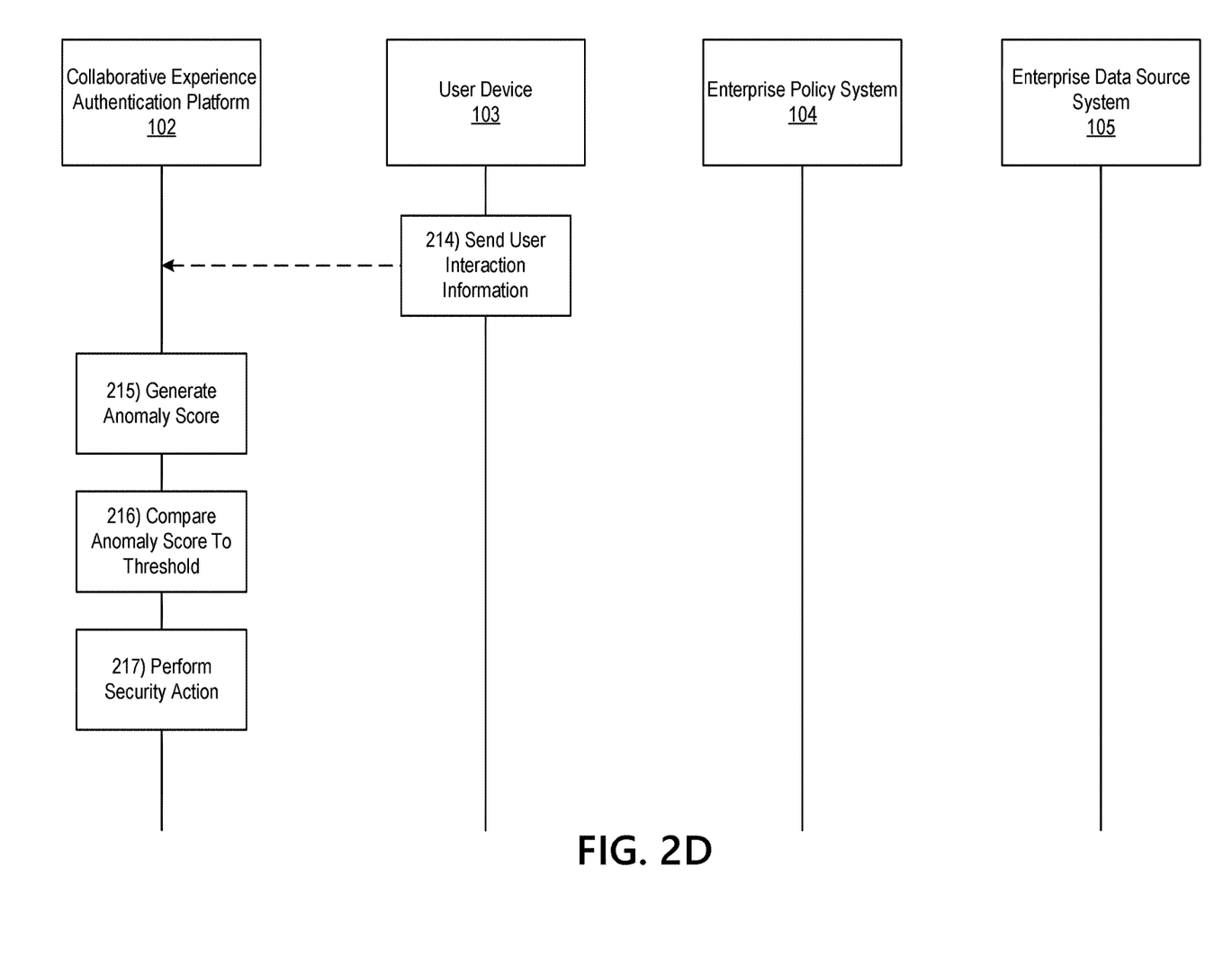

Referring to FIG. 2D, at step 214, the user device 103 may send user interaction information to the collaborative experience authentication platform 102. For example, the user device 103 may send information to the collaborative experience authentication platform 102 comprising interactions between the user of the user device 103 and the downstream services of the API. In some instances, in sending the user interaction information, the user device 103 may send movement data corresponding to an avatar configured to interact with the collaborative experience service. For example, the user device 103 may send information indicating: avatar hand movements, avatar dominant hands, running gaits of the avatars, head turning motions of the avatars, speech patterns, eye movements, and/or other information indicating interactions, movements, and/or other data corresponding to a user of the user device 103. Additionally or alternatively, the user device 103 may send biometric information. Additionally or alternatively, the user device 103 may send device information, connectivity pattern information, and/or other information.

At step 215, the collaborative experience authentication platform 102 may feed the user interaction information into the anomaly detection model (e.g., trained at step 204). In doing so, the collaborative experience authentication platform 102 may identify whether any of the user interaction information is outside of a predetermined tolerance window when compared to the user's baseline. If any of the user interaction information is outside of the predetermined tolerance window, the collaborative experience authentication platform 102 may identify an anomaly for the user. If none of the above described metrics are outside of the predetermined tolerance window, the collaborative experience authentication platform 102 may identify that no anomalous behavior has been detected for the user.

Although the anomaly analysis is described at step 215, such analysis may be continuous and dynamic throughout a duration of the collaborative experience service. For example, data/information for the user may be continuously received and analyzed to detect any anomalies (e.g., not merely upon admittance to the collaborative experience service or a single interaction). Similarly, as additional user interaction information is received, the collaborative experience authentication platform 102 may use this additional data/information to dynamically refine/update the anomaly detection model to improve its performance, accuracy, and capabilities over time. Such detection may be important, for example, because in such collaborative experiences, as described above, individuals might not be observable themselves within the collaborative experience (e.g., as they would be in a conventional video call). For example, each individual may be represented by an avatar, and thus it may be easier for an unauthorized individual to pose as an authorized individual (because only a corresponding avatar may be visible rather than an image of the individual themselves). Accordingly, such analysis may enable the identification of anomalous behavior, regardless of the use of the avatars, and appropriate action may be taken accordingly (as described further below) to prevent unauthorized individuals from covertly accessing private collaborative experiences.

In some instances, in detecting anomalies, the collaborative experience authentication platform 102 may identify anomalies in a device used by the particular user (e.g., do they typically connect or login from a different device, but are connecting from the user device 103 today, or the like). Additionally or alternatively, the collaborative experience authentication platform 102 may identify anomalies in connectivity patterns (e.g., a time of connection, location of connection, data being requested, and/or other connectivity information).

If an anomaly is detected, the collaborative experience authentication platform 102 may score the detected anomaly. For example, the collaborative experience authentication platform 102 may score the detected anomaly based on, for example, a standard deviation (or number of standard deviations) of the detected anomaly when compared to the corresponding baseline. For example, the collaborative experience authentication platform 102 may assign a score based on the corresponding number of standard deviations. For example, the collaborative experience authentication platform 102 may apply the following model to score the anomaly:

$$\text{anomaly score} = \sqrt{\frac{\sum (x_i - \mu)^2}{N}}.$$

In these instances, N may represent a data points used to establish the corresponding baseline value plus one (e.g., plus an extra data point representative of the newly received data), μ may represent the previously identified baseline value for the corresponding metric (which may e.g., be an average), and $x_i$ may represent a value of the newly received data.

In some instances, the collaborative experience authentication platform 102 may use these individually identified anomaly scores to establish dynamic and comprehensive compliance scores for each participant in the collaborative experience service. In some of these instances, the comprehensive score may be compared to a predetermined security threshold as described below, and security actions may be taken accordingly. In these instances, the comparison of the comprehensive scores may be performed in addition to or as an alternative to the comparison of the specific anomaly scores.

At step 216, the collaborative experience authentication platform 102 may compare the anomaly score (identified at step 215) to a predetermined security threshold. For example, the collaborative experience authentication platform 102 may perform the comparison using the model:

$$\sqrt{\frac{\sum (x_{i-}\mu)^2}{N}} \geq 1,$$

then anomaly detected and if $$\sqrt{\frac{\sum (x_{i-}\mu)^2}{N}} < 1,$$

no anomaly detected. If the collaborative experience authentication platform 102 identifies that the anomaly score meets or exceeds the security threshold, the collaborative experience authentication platform 102 may proceed to step 217. Otherwise, if the collaborative experience authentication platform 102 may proceed to step 218.

Figure 5:
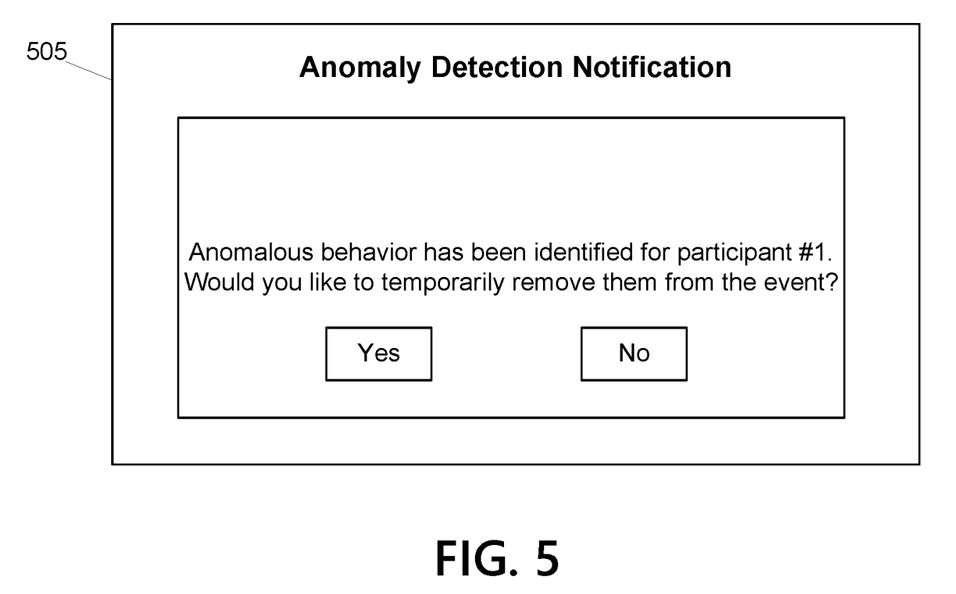

At step 217, based on or in response to detecting that the anomaly score met or exceeded the security threshold, the collaborative experience authentication platform 102 may perform one or more security actions. For example, the collaborative experience authentication platform 102 may remove the user from the collaborative experience service, move the user to a waiting room of the collaborative experience service, prompt the user to re-authenticate to the collaborative experience service, notify a host or system administrator of the collaborative experience service of the detected anomaly (e.g., using a notification similar to notification 505, which is illustrated in FIG. 5), and/or perform one or more other security actions.

Figure 2E:
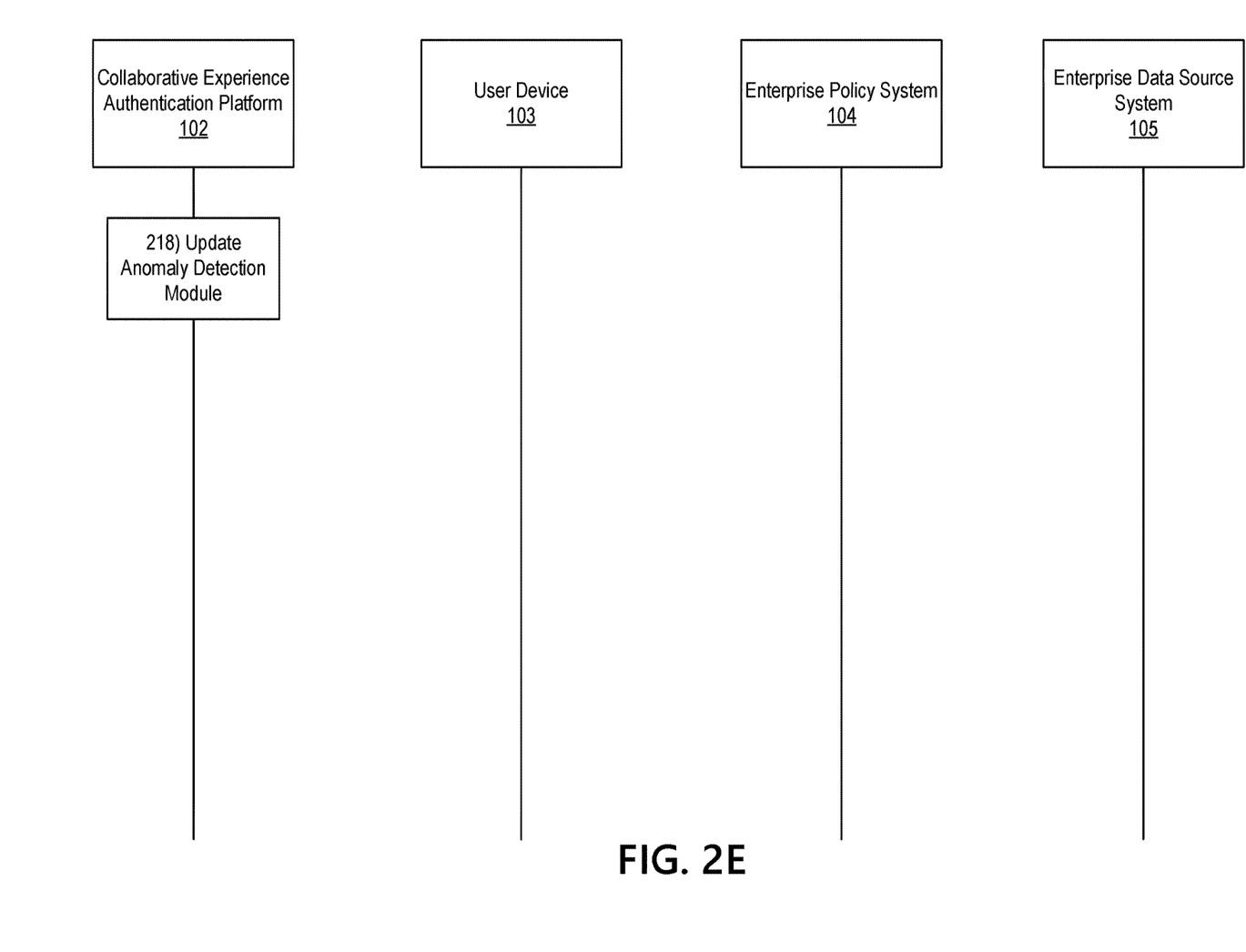

Referring to FIG. 2E, at step 218, the collaborative experience authentication platform 102 may dynamically refine/update the anomaly detection model, using the user interaction information, to improve its performance, accuracy, and capabilities over time.

Figure 3:
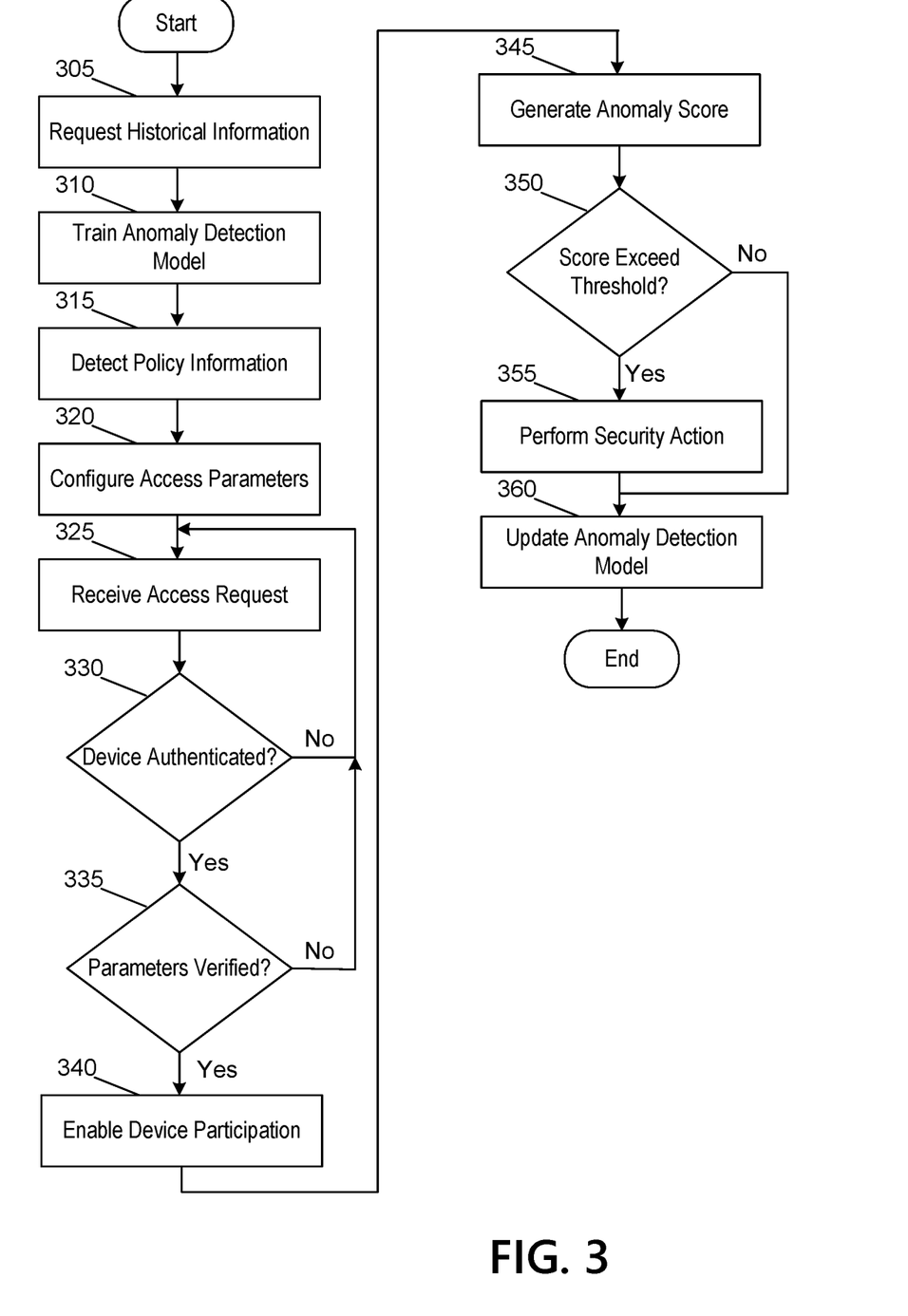
FIG. 3 depicts an illustrative method for providing an API for uniform security access on a 5G network in accordance with one or more example embodiments.

FIG. 3 depicts an illustrative method for providing an API for uniform security access on a 5G network in accordance with one or more example embodiments. Referring to FIG. 3, at step 305, a computing platform having at least one processor, a communication interface, and memory may request historical interaction information. At step 310, the computing platform may train an anomaly detection model using the historical information. At step 315, the computing platform may detect policy information from an enterprise policy system. At step 320, the computing platform may configure access parameters at an API used to access a collaborative experience service based on the policy information. At step 325, the computing platform may receive a request to access the collaborative experience service. At step 330, the computing platform may identify whether or not a device making the request is authenticated. If the device is not authenticated, the computing platform may return to step 325. If the device is authenticated, the computing platform may proceed to step 335.

At step 335, the computing platform may identify whether or not the parameters of the device comply with the access parameters. If the computing platform identifies that the parameters of the device do not comply with the access parameters, the computing platform may return to step 325. If the computing platform identifies that the parameters of the device do comply with the access parameters, the computing platform may proceed to step 340.

At step 340, the computing platform may grant the device access to the collaborative experience service. At step 345, the computing platform may generate an anomaly score for the device. At step 350, the computing platform may compare the anomaly score to an anomaly detection threshold. If the computing platform identifies that the anomaly score does not exceed the anomaly detection threshold, it may proceed to step 360. If the computing platform identifies that the anomaly score meets or exceeds the anomaly detection threshold, it may proceed to step 355.

At step 355, the computing platform may perform a security action. At step 360, the computing platform may update the anomaly detection model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from a 5G compatible user device, a request to access a collaborative experience service, wherein the collaborative experience service provides one or more of: augmented reality features or virtual reality features;
   attempt to authenticate the 5G compatible user device;
   after attempting to authenticate the 5G compatible user device, identify whether the compatible user device is authenticated;
   based on identifying that the 5G compatible user device is not authenticated, deny access to the collaborative experience service;
   based on identifying that the 5G compatible user device is authenticated:
      grant the 5G compatible user device access to an application programming interface (API) that may be used to access the collaborative experience service;
      compare attributes of the 5G compatible user device to a stored security policy for the API;
      based on comparing the attributes of the 5G compatible user device to the stored security policy for the API, identify whether the attributes of the 5G compatible user device comply with the stored security policy;
      based on identifying that the attributes of the 5G compatible user device do not comply with the stored security policy, deny access to the collaborative experience service;
      based on identifying that the attributes of the 5G compatible user device comply with the stored security policy, grant access to the collaborative experience service;
      receive user interaction information indicating interactions of a user of the compatible user device with the collaborative experience service, wherein the user interaction information indicates one or more of: augmented reality interactions or virtual reality interactions;
      input the user interaction information into an anomaly detection model, wherein inputting the user interaction information into the anomaly detection model causes the anomaly detection model to analyze the user interaction information to identify if the interactions comprise an anomaly for the user;
      based on identifying that the interactions comprise an anomaly for the user, terminate the access to the collaborative experience service; and
      based on identifying that the interactions do not comprise an anomaly for the user, maintain the access to the collaborative experience service.

2. The computing platform of claim 1, wherein receiving the user interaction information comprises receiving, from one or more biometric data collection devices, the user interaction information.

3. The computing platform of claim 1, wherein terminating the access to the collaborative experience service comprises one or more of: removing the user from the collaborative experience service, moving the user to a waiting room of the collaborative experience service, or prompting the user to re-authenticate to the collaborative experience service.

4. The computing platform of claim 1, wherein the memory stores additional computer-readable instructions that, when executed by the at least one processor, cause the computing platform to:
   based on identifying that the interactions comprise an anomaly for the user, send a notification to a system administrator for the collaborative experience service indicating the identified anomaly.

5. The computing platform of claim 1, wherein the attributes of the 5G compatible user device comprise one or more of: an operating system, a type of encryption, a type of connection, or a requested type of information.

6. The computing platform of claim 1, wherein granting the access to the collaborative experience service comprises granting access to a subset of features offered by the collaborative experience service.

7. The computing platform of claim 6, wherein granting the access to the collaborative experience service grants 5G compatible user device read-only permissions.

8. The computing platform of claim 1, wherein the memory stores additional computer-readable instructions that, when executed by the at least one processor, cause the computing platform to:
   based on identifying that the attributes of the 5G compatible user device do not comply with the stored security policy, send a notification to the 5G compatible user device indicating one or more non-compliant attributes of the 5G compatible user device.

9. The computing platform of claim 1, wherein the memory stores additional computer-readable instructions that, when executed by the at least one processor, cause the computing platform to:
   based on identifying that the attributes of the 5G compatible user device do not comply with the stored security policy, send a software update to the 5G compatible user device to bring the 5G compatible user device in compliance with the stored security policy.

10. The computing platform of claim 1, wherein the anomaly detection model is configured to continually analyze additional received user interaction information throughout a duration of the collaborative experience service.

11. A method comprising:
    at a computing platform comprising at least one processor, a communication interface, and memory:

receiving, from a 5G compatible user device, a request to access a collaborative experience service, wherein the collaborative experience service provides one or more of: augmented reality features or virtual reality features;
attempting to authenticate the 5G compatible user device;
after attempting to authenticate the 5G compatible user device, identifying whether the 5G compatible user device is authenticated;
based on identifying that the 5G compatible user device is not authenticated, denying access to the collaborative experience service;
based on identifying that the 5G compatible user device is authenticated:
granting the 5G compatible user device access to an application programming interface (API) that may be used to access the collaborative experience service;
comparing attributes of the 5G compatible user device to a stored security policy for the API;
based on comparing the attributes of the 5G compatible user device to the stored security policy for the API, identifying whether the attributes of the 5G compatible user device comply with the stored security policy;
based on identifying that the attributes of the 5G compatible user device do not comply with the stored security policy, denying access to the collaborative experience service;
based on identifying that the attributes of the 5G compatible user device comply with the stored security policy, granting access to the collaborative experience service;
receiving user interaction information indicating interactions of a user of the 5G compatible user device with the collaborative experience service, wherein the user interaction information indicates one or more of: augmented reality interactions or virtual reality interactions;
inputting the user interaction information into an anomaly detection model, wherein inputting the user interaction information into the anomaly detection model causes the anomaly detection model to analyze the user interaction information to identify if the interactions comprise an anomaly for the user;
based on identifying that the interactions comprise an anomaly for the user, terminating the access to the collaborative experience service; and
based on identifying that the interactions do not comprise an anomaly for the user, maintaining the access to the collaborative experience service.

12. The method of claim 11, wherein receiving the user interaction information comprises receiving, from one or more biometric data collection devices, the user interaction information.

13. The method of claim 11, wherein terminating the access to the collaborative experience service comprises one or more of: removing the user from the collaborative experience service, moving the user to a waiting room of the collaborative experience service, or prompting the user to re-authenticate to the collaborative experience service.

14. The method of claim 11, further comprising:
based on identifying that the interactions comprise an anomaly for the user, sending a notification to a system administrator for the collaborative experience service indicating the identified anomaly.

15. The method of claim 11, wherein the attributes of the 5G compatible user device comprise one or more of: an operating system, a type of encryption, a type of connection, or a requested type of information.

16. The method of claim 11, wherein granting the access to the collaborative experience service comprises granting access to a subset of features offered by the collaborative experience service.

17. The method of claim 16, wherein granting the access to the collaborative experience service grants 5G compatible user device read-only permissions.

18. The method of claim 11, further comprising:
based on identifying that the attributes of the 5G compatible user device do not comply with the stored security policy, sending a notification to the 5G compatible user device indicating one or more non-compliant attributes of the 5G compatible user device.

19. The method of claim 11, further comprising:
based on identifying that the attributes of the 5G compatible user device do not comply with the stored security policy, sending a software update to the 5G compatible user device to bring the 5G compatible user device in compliance with the stored security policy.

20. One or more non-transitory computer-readable media storing instructions that, when executed by a computing platform comprising at least one processor, a communication interface, and memory, cause the computing platform to:
receive, from a 5G compatible user device, a request to access a collaborative experience service, wherein the collaborative experience service provides one or more of: augmented reality features or virtual reality features;
attempt to authenticate the 5G compatible user device;
after attempting to authenticate the 5G compatible user device, identify whether the 5G compatible user device is authenticated;
based on identifying that the 5G compatible user device is not authenticated, deny access to the collaborative experience service;
based on identifying that the 5G compatible user device is authenticated:
grant the 5G compatible user device access to an application programming interface (API) that may be used to access the collaborative experience service;
compare attributes of the 5G compatible user device to a stored security policy for the API;
based on comparing the attributes of the 5G compatible user device to the stored security policy for the API, identify whether the attributes of the 5G compatible user device comply with the stored security policy;
based on identifying that the attributes of the 5G compatible user device do not comply with the stored security policy, deny access to the collaborative experience service;
based on identifying that the attributes of the 5G compatible user device comply with the stored security policy, grant access to the collaborative experience service;
receive user interaction information indicating interactions of a user of the 5G compatible user device with the collaborative experience service, wherein the user interaction information indicates one or more of: augmented reality interactions or virtual reality interactions;

input the user interaction information into an anomaly detection model, wherein inputting the user interaction information into the anomaly detection model causes the anomaly detection model to analyze the user interaction information to identify if the interactions comprise an anomaly for the user;

based on identifying that the interactions comprise an anomaly for the user, terminate the access to the collaborative experience service; and based on identifying that the interactions do not comprise an anomaly for the user, maintain the access to the collaborative experience service.

* * * * *